May 27, 1969

E. B. BUTLER ET AL 3,446,686

METHOD IN LAMINATING REINFORCED SHEET

Filed July 29, 1964

INVENTORS
EUGENE B. BUTLER
DONALD R. CARDIS
HAROLD P. SCHICK

Kenyon, Palmer, Stewart & Estabrook

ATTORNEYS

United States Patent Office 3,446,686
Patented May 27, 1969

3,446,686
METHOD IN LAMINATING REINFORCED SHEET
Eugene B. Butler, Kent, Donald R. Cardis, Barberton, and Harold P. Schick, Tallmadge, Ohio, assignors to The General Tire & Rubber Company, Akron, Ohio, a corporation of Ohio
Filed July 29, 1964, Ser. No. 385,901
Int. Cl. B29c *17/04;* B32b *1/02*
U.S. Cl. 156—224                                                3 Claims

ABSTRACT OF THE DISCLOSURE

Shaped sections of fabric-backed plastic material, e.g., vinyl sheets backed with knit fabric, are formed by coating a face of a section of fabric with an adhesive, plying a sheet of plastic material to the adhesive coated surface of the fabric, clamping the plied sheet and fabric around the edges in a mold with the fabric in a tensilely relaxed condition and applying fluid pressure to the exposed face of the plastic sheet to conform the plied materials to the shape of the mold and simultaneously laminate the plastic sheet to the fabric.

---

Fabric-backing is in fairly widespread use for molded reinforced plastic articles in industry today. In previous methods, this material has been generally prefabricated by laminating, calendering and/or embossing sheets of plastic and fabric so that they are integrally bound together and then subsequently, usually at some other time and place, forming the laminated material molds to produce the shaped article.

One of the major disadvantages of prior methods, as described above, is that the fabric-backing material is placed in a prestressed condition by the prefabrication steps thereby limiting the depth of molding or degree of elongation to which the laminate may be subjected without rupturing the fabric backing. The initial stress is imparted to the fabric by the tensions imposed thereon during calendering, laminating or embossing to which the material is subjected during the prefabrications thereof.

Another disadvantage of prior methods results from the fact that the laminate is permanent throughout the total area thereof. In forming the laminate, and particularly in vacuum forming processes, an excess marginal area, i.e., the portion of the material held during the forming operation, remains on the article after formation and must be trimmed off. When a pre-laminated material is used, this excess is scrapped and cannot be reprocessed since it is essentially an inseparable combination of fabric and plastic.

Accordingly, it is an object of this invention to provide a method for fabricating reinforced plastic articles which avoids the above-stated disadvantages of the prior art.

It is another object of the present invention to provide a formed, fabric-backed sheet plastic article in which the residual stress in the fabric backing is minimal by avoiding prefabrication and prestressing of the fabric backing.

It is a further object of this invention to provide a method of forming fabric-backed plastic articles in which the material may be elongated in forming to a greater degree than heretofore possible by avoiding prefabrication prestressing of the materials.

It is still another object of the present invention to provide a method of forming a laminated sheet material in which edge portions of the material may be salvaged and processed for reuse.

These and other objects of the invention will become more readily understood by reference to the following detailed description when viewed in the light of the accompanying drawing in which like reference numerals indicate like parts throughout the figures thereof and wherein.

The objects of this invention are achieved, briefly, by accomplishing the step of laminating a fabric reinforced plastic article at the same time that the article is formed. By producing the article in this manner, the fabric may be disposed over the mold in a loose, unstressed condition so that it may be elongated to a much greater extent than would be possible if the fabric had been prelaminated to the plastic material.

Figure 1:
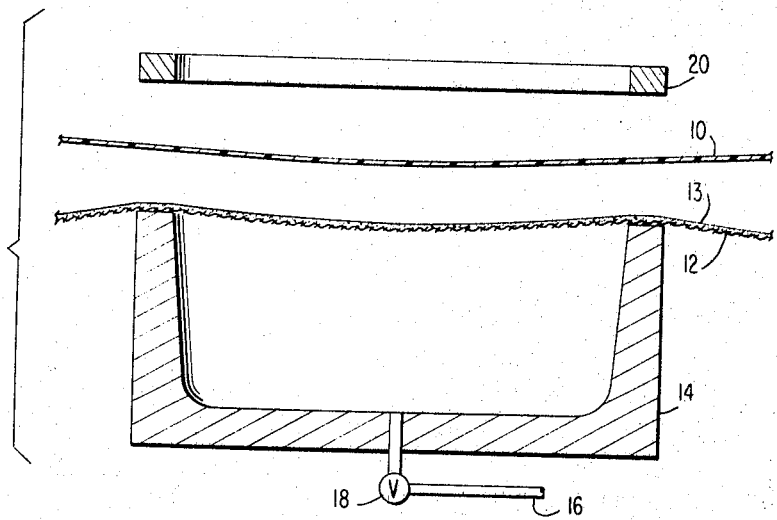
FIGURE 1 is a sectional side view in section showing a vacuum mold and the material prior to assembly thereof for forming in accordance with the invention.

Turning now to FIGURE 1 of the drawing a sheet of thermoplastic material 10 is disposed over a knit fabric 12 which, in turn, is loosely draped over a vacuum mold 14. The knit fabric web 12 and the plastic sheet 10 are preferably of the same planform area and may be provided in individual panels or, if preferred from a continuous process standpoint, may be portions of webs of indefinite length which are intermittantly moved over the molds as the process is performed in repetitive cycles. The mold 14 is provided with an exhaust duct 16 which is suitably connected to a vacuum source (not shown). Application of vacuum to the mold is controlled by a valve 18. A vacuum mold frame 20 is shown disposed above the unassembled plastic sheet 10 and knit web 12.

Although thermoplastic vinyl chloride polymer sheet material in combination with a knit fabric is advantageously used in the new processes, other suitable backing materials, including some woven fabrics, open mesh or the like, as well as other types of deformable plastic sheet material may be used. An adhesive 13 is coated on the upper face of the fabric web 12 adjacent to the plastic sheet 10. The adhesive may be of any type commonly in use but is preferably of the heat sensitive or thermoplastic type such, for example, as solvent solutions of polyvinylchloride resins, plastisols or proprietary heat sensitive adhesives. An example of the first-mentioned type of adhesive is a vinyl chloride and vinyl acetate copolymer, and methyl ethyl ketone (MEK) solvent in the following proportions:

Vinyl chloride and vinyl acetate copolymer [1] _____ 15
Methyl ethyl ketone _____ 100

As an example of a plastisol which may be used, the following combination has proven acceptable in this process:

Vinyl chloride in the plastisol range which can
 be fused at 300° F.[2] _____ 100
A high molecular weight plasticizer [3] _____ 90
An organic compound of barium and cadmium with
 chelating agents in solvent [4] _____ 3

[1] Available under the trade name "Vyns."
[2] Available under the trade name "Geon 135."
[3] I.e. a compound under the trade name "Rohm & Haas G62."
[4] Available under the trade name "Vanstay RR."

For a propriety adhesive, any curable adhesive may be used provided it is heat sensitive and it is used before it cures sufficiently to lose its heat sensitivity or thermoplastic characteristics. For example, an adhesive available under the trade name "Angiers SBC 1918" combined with a curing agent has been found to be particularly suited for use in the process of this invention.

In the event that a heat activated adhesive or the like is used, the adhesive may be applied at any time prior to the further forming steps of this process. If, however, a more common type of adhesive is used, this step should be accomplished shortly preceding the forming steps. This adhesive can also be placed on the lower surface of the plastic sheet 10 or interposed as a separate layer between the plastic sheet 10 and the fabric web 12, e.g. as a self-supporting film.

Figure 2:
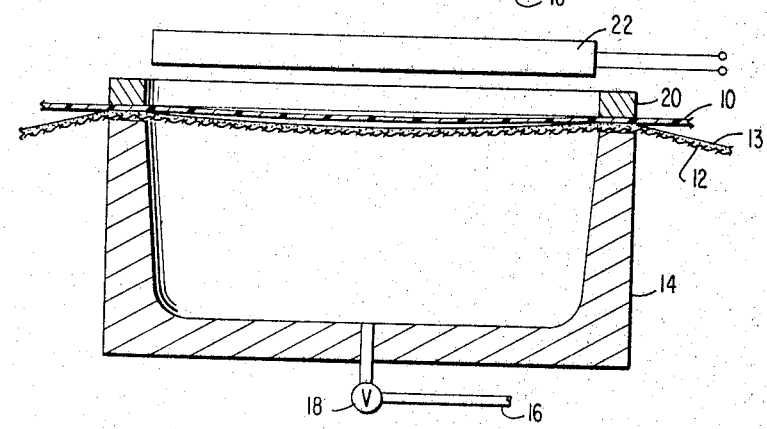
FIGURE 2 is a sectional side view similar to FIGURE 1 after the material and mold have been assembled.

Referring now to FIGURE 2 of the drawings, the frame 20 is shown lowered on the upper face of the mold 14 to bring the plastic and fabric web 12 into abutting relationship with one another proximate the edges thereof and to grip the materials to hold them firmly around the periphery of the mold. This also provides a gas-tight chamber within the mold below the materials to enable vacuum forming thereof. A heater 22 connected to a suitable source of electrical energy (not shown) is disposed over the mold and supplies heat to the materials until the thermoplastic is softened and the heat activated adhesive on the fabric 12 becomes tacky. At this point the valve 18 is opened to apply vacuum to the chamber beneath the fabric and plastic to draw the materials into the mold under the influence of atmospheric pressure.

Figure 3:
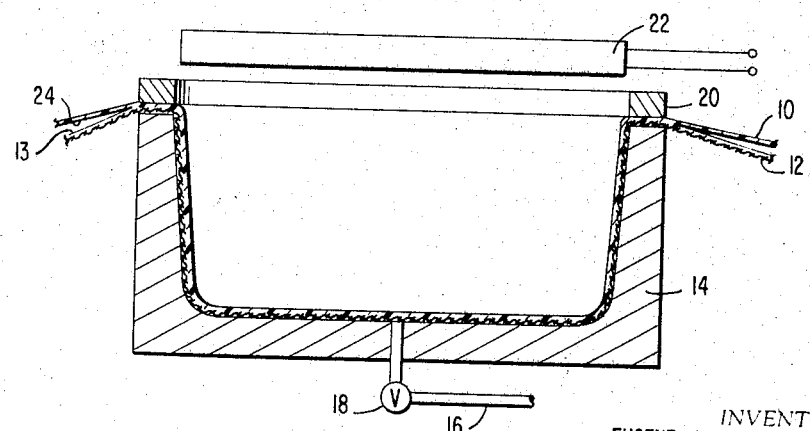
FIGURE 3 is a sectional side view similar to FIGURE 2 after the molding of the material has taken place and the article has been formed in accordance with the invention.

Referring to FIGURE 3, the process is shown in the terminal step thereof with the plastic 10 and the fabric 12 formed to and laminated within the mold. The vacuum force pulling the plastic against the knit fabric as well as against the mold will adhere the vinyl and the knit fabric together through the medium of the heat sensitive adhesive. After the material is properly molded, the heater 22 is turned off or removed and the article is allowed to cool. After cooling the formed article is removed from the mold and is trimmed.

This invention allows the provision of the full potential stretch of the fabric during the thermo-forming operation. As was stated above, in the conventional operation using a calendered vinyl material, stretch is induced in the reinforcing medium during calendering, lamination and/or embossing by the tensions used in those processes and the loss of stretch caused thereby reduces the stretch available during the thermo-forming operation. The invention therefore provides a greater degree of thermoformability in fabric backed laminated plastic material than has been heretofore available.

As was also pointed out, the material in the edge area 24 does not undergo lamination since it is not subjected to heat and/or presure in the forming operation and may therefore be segregated and used for other purposes and/or, in the case of the plastic material, reprocessed.

Although a vacuum forming operation is specifically described herein, it should be obvious that any type of pressure differential operation may be used without exceeding the scope of the invention. What has been set out above is intended to be exemplary to enable practice thereof by those skilled in the art and it should therefore be understood that the invention may be practiced other than as specifically described.

What is claimed as new and desired to be protected by Letters Patent of the United States is:

1. A process for making laminated-shaped sections of fabric-backed plastic material having a low amount of residual forming stress therein which comprises:

coating a face of knit fabric with a heat sensitive adhesive;

disposing a thermoplastic polyvinyl chloride sheet in in facially adjacent relationship to the coated face of said knit fabric;

placing said sheet and fabric with at least the fabric in a tensilely relaxed condition in molding relationship on a mold with the fabric and sheet clamped together around the periphery of the mold;

heating the sheet and fabric while held in said molding relationship to a temperature sufficient to activate said heat sensitive adhesive and soften said sheet but below a free-flowing temperature for the thermoplastic;

drawing a vacuum within the mold to conform the sheet and fabric to the mold for simultaneous lamination of the sheet and fabric and shaping of the resulting laminate;

and cooling said laminate to fix the sheet and fabric in the resulting molded laminar relationship.

2. A process for the production of an article of fabric reinforced plastic having a permanent three-dimensional countoured shape which comprises:

(a) forming an assembly of a continuous sheet of thermoplastic material in facially adjacent relationship to a section of stretchable fabric with a layer of heat sensitive adhesive between said sheet and said fabric, (b) placing said assembly with at least the fabric in a relaxed condition in molding relationship on a mold with the fabric between the molding surface of the mold and the plastic sheet, (c) clamping said assembly around the periphery of the mold, (d) heating said assembly to a temperature sufficient to activate said heat sensitive adhesive and soften said sheet but below a free-flowing temperature for the thermoplastic material, (e) drawing a vacuum within the mold to conform said assembly to the mold with simultaneous lamination of the sheet and fabric and shaping of the laminate, (f) cooling the shaped laminate and removing it from the mold.

3. A process as claimed in claim 2 wherein said fabric is a knit fabric.

References Cited

UNITED STATES PATENTS

| | | | |
|---|---|---|---|
| 3,190,781 | 6/1965 | Metz | 156—285 XR |
| 2,714,571 | 8/1955 | Irion et al. | 156—311 XR |
| 2,722,495 | 11/1955 | Hedges | 161—89 XR |
| 2,823,156 | 2/1958 | Hedges | 161—89 |
| 2,978,376 | 4/1961 | Hulse | 156—286 XR |
| 3,028,279 | 4/1962 | Heberlein | 161—76 XR |

EARL M. BERGERT, *Primary Examiner.*

H. F. EPSTEIN, *Assistant Examiner.*

U.S. Cl. X.R.

156—229, 285, 311; 161—89